United States Patent
Jung et al.

(10) Patent No.: US 7,929,417 B2
(45) Date of Patent: Apr. 19, 2011

(54) METHOD OF ALLOCATING REFERENCE SIGNALS IN MIMO SYSTEM

(75) Inventors: Jin Hyuk Jung, Anyang-si (KR); Bin Chul Ihm, Anyang-si (KR); Jae Wan Kim, Anyang-si (KR); Hyun Soo Ko, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 12/445,073

(22) PCT Filed: Oct. 11, 2007

(86) PCT No.: PCT/KR2007/004968
§ 371 (c)(1),
(2), (4) Date: Apr. 9, 2009

(87) PCT Pub. No.: WO2008/044882
PCT Pub. Date: Apr. 17, 2008

(65) Prior Publication Data
US 2010/0103949 A1    Apr. 29, 2010

Related U.S. Application Data

(60) Provisional application No. 60/829,273, filed on Oct. 12, 2006, provisional application No. 60/863,775, filed on Oct. 31, 2006.

(30) Foreign Application Priority Data

Aug. 28, 2007 (KR) .......................... 10-2007-0086406

(51) Int. Cl.
*H04J 11/00* (2006.01)

(52) U.S. Cl. .......................... 370/210; 370/208; 370/334
(58) Field of Classification Search .................. None
See application file for complete search history.

(56) References Cited

U.S. PATENT DOCUMENTS

| | | | |
|---|---|---|---|
| 7,095,709 | B2 | 8/2006 | Walton et al. |
| 2005/0025039 | A1 | 2/2005 | Hwang et al. |
| 2007/0177631 | A1 | 8/2007 | Popovic et al. |
| 2007/0211667 | A1 | 9/2007 | Agrawal et al. |

(Continued)

FOREIGN PATENT DOCUMENTS

| | | |
|---|---|---|
| KR | 10-2006-0035941 | 4/2006 |
| KR | 10-2006-0040180 | 5/2006 |

OTHER PUBLICATIONS

Q. Li et al., "Pilot Allocations for 5,6,7, and 8 BS Antennas," IEEE 802.16 Broadband Wireless Access Working Group, IEEE C802.16e-04/523r3, Nov. 2004.

(Continued)

*Primary Examiner* — Duc C Ho
(74) *Attorney, Agent, or Firm* — Lee, Hong, Degerman, Kang & Waimey

(57) ABSTRACT

There is provided a method of allocating reference signals in a multiple-input multiple-output (MIMO) system. The method includes allocating a first reference signal, a second reference signal and a third reference signal in a first OFDM symbol so that the first reference signal, the second reference signal and the third reference signal do not overlap with each other and allocating the first reference signal, the second reference signal and a fourth reference signal in a second OFDM symbol so that the first reference signal, the second reference signal and the fourth reference signal do not overlap with each other. The first reference signal and the second signal are allocated in a regular interval in a single OFDM symbol.

6 Claims, 4 Drawing Sheets

U.S. PATENT DOCUMENTS

2009/0016461 A1* 1/2009 Jitsukawa et al. ............. 375/267
2009/0232243 A1* 9/2009 Tsuboi et al. ................. 375/267

OTHER PUBLICATIONS

K. Um et al., "Transmission Schemes for 2 or More Antenna MSS in UL," IEEE 802.16 Broadband Wireless Access Working Group, IEEE C802.16e-04/248, Aug. 2004.

R. Yaniv et al., "Corrections to Definitions of Uplink MIMO in OFDMA PHY," IEEE 802.16 Broadband Wireless Access Working Group, IEEE C802.16e-04/68r3, Jan. 2005.

H. Yang, "A Road to Future Broadband Wireless Access: MIMO-OFDM-Based Air Interface," IEEE Communications Magazine, vol. 43, Issue 1, pp. 53-60, Jan. 2005.

* cited by examiner

[Fig. 1]
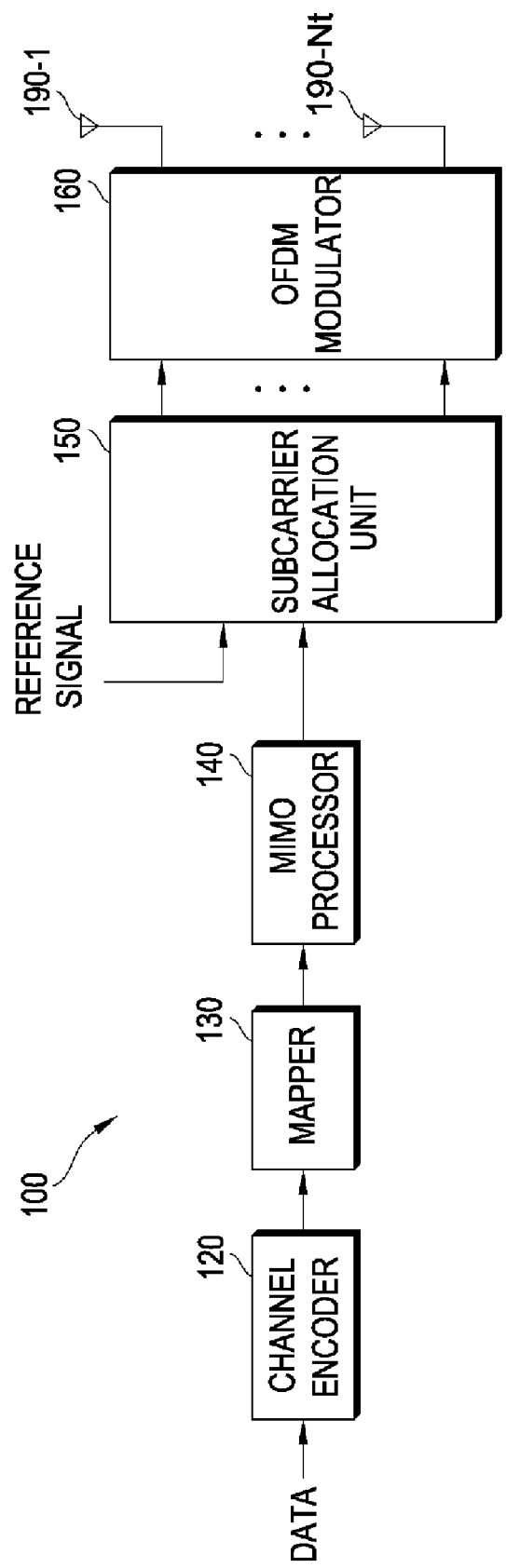

[Fig. 2]
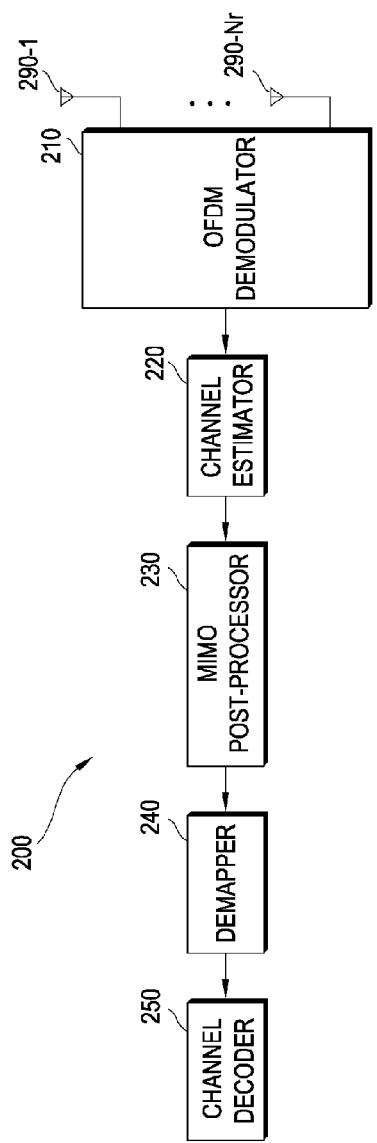
[Fig. 3]
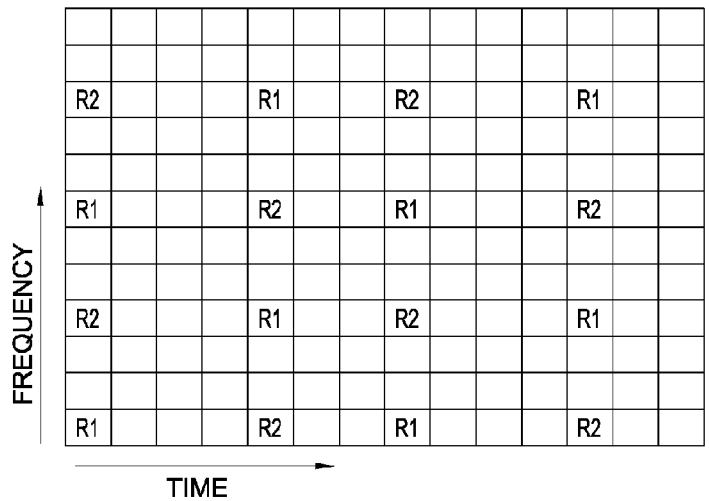

[Fig. 4]
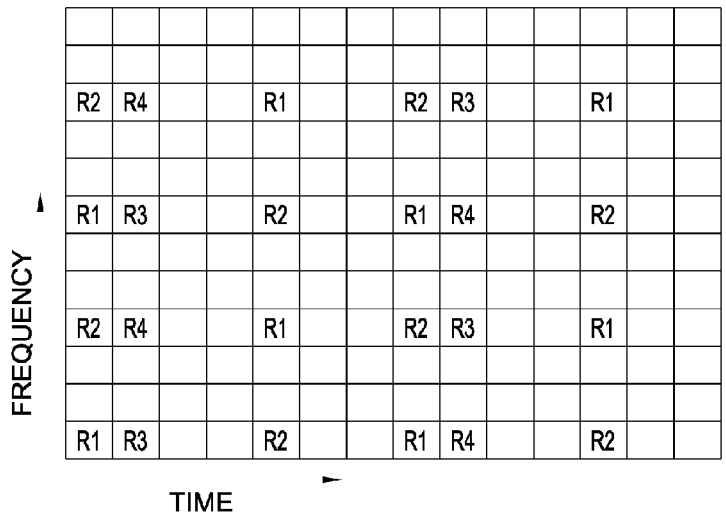
[Fig. 5]
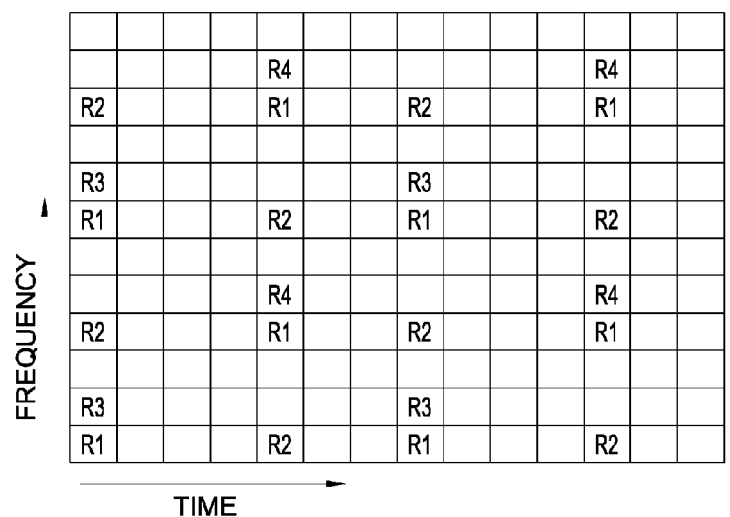
[Fig. 6]
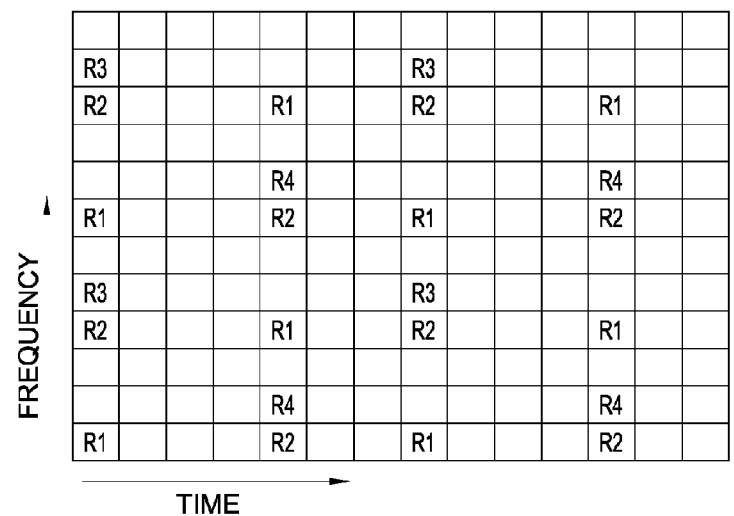

[Fig. 7]
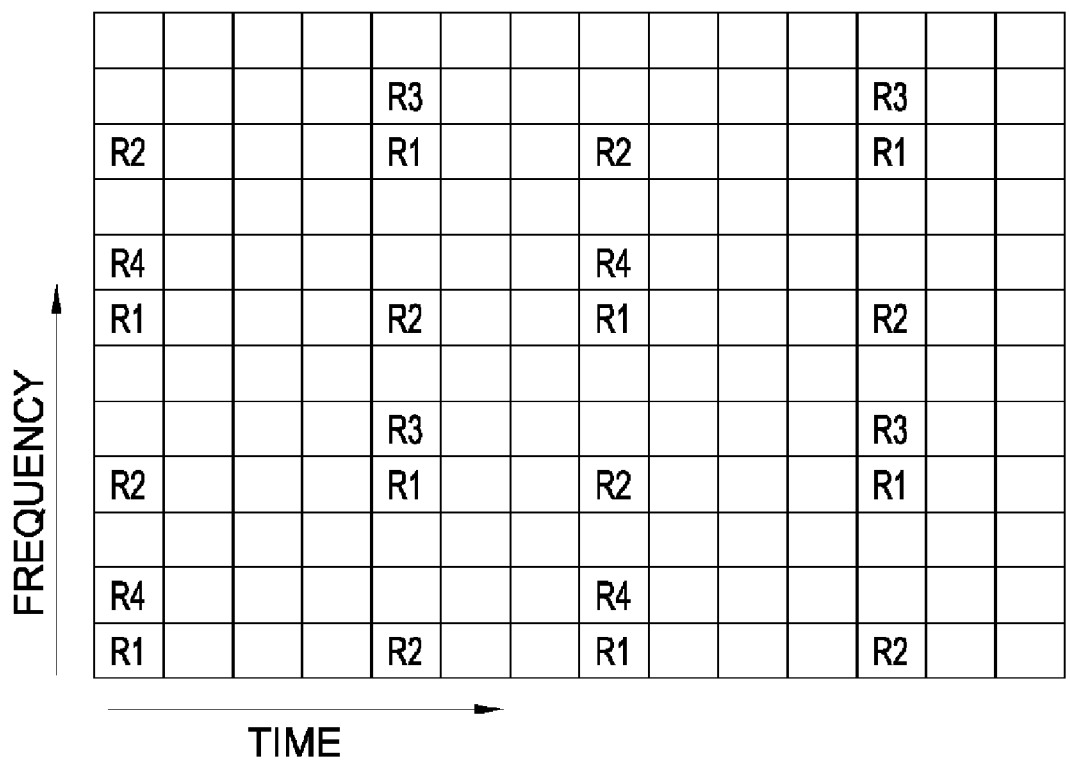
[Fig. 8]
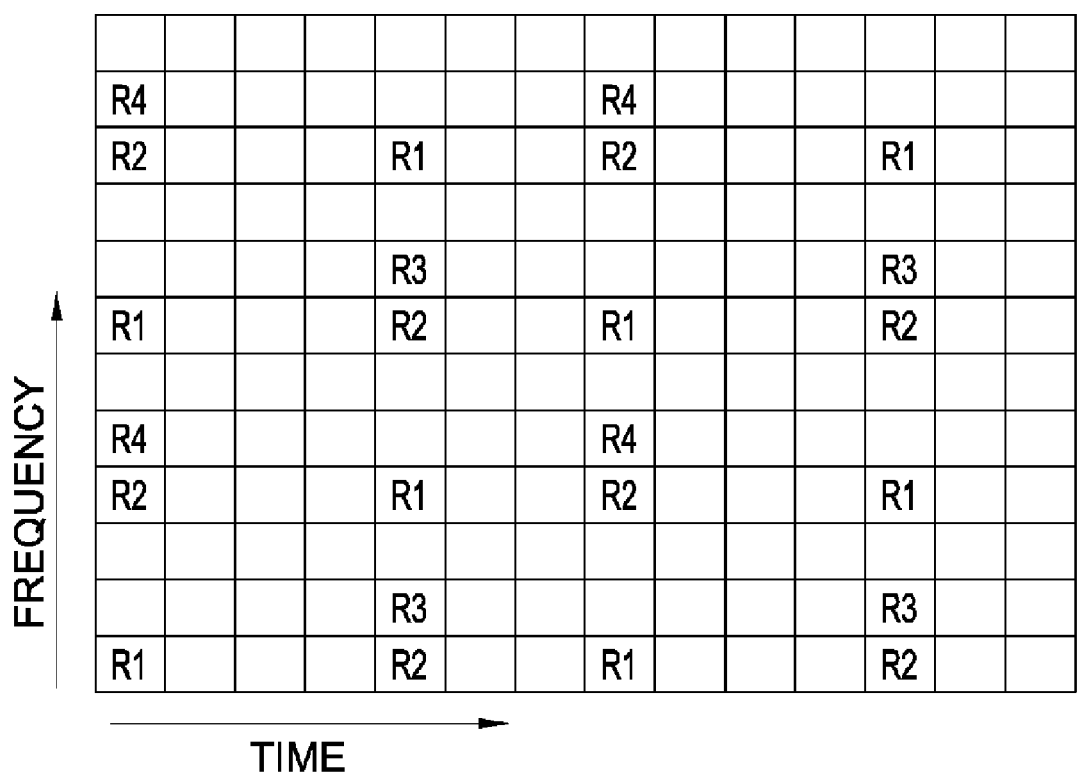

METHOD OF ALLOCATING REFERENCE SIGNALS IN MIMO SYSTEM

CROSS-REFERENCE TO RELATED APPLICATIONS

This application is the National Stage filing under 35 U.S.C. §371 of International Application No. PCT/KR2007/004968, filed on Oct. 11, 2007, which claims the benefit of U.S. Provisional Application Nos. 60/829,273, filed on Oct. 12, 2006, and 60/863,775, filed on Oct. 31, 2006, and claims benefit of earlier filing date and right to priority to Korean Application No. 10-2007-0086406, filed on Aug. 28, 2007.

TECHNICAL FIELD

The present invention relates to wireless communication, and more particularly, to a method of allocating reference signals in a multiple-input multiple-output (MIMO) system.

BACKGROUND ART

A multiple-input multiple-output (MIMO) system is defined as a system that improves data communication efficiency by the use of multiple transmit antennas and multiple receiving antennas. The MIMO system may be realized using a MIMO scheme such as a spatial multiplexing and a spatial diversity. According to the spatial multiplexing, different streams are concurrently transmitted through the multiple transmit antennas, and thus fast transmission can be achieved without increase of system bandwidth. According to the spatial diversity, same streams are transmitted through the multiple transmit antennas to obtain diversity.

In order to reproduce a signal transmitted from a transmitter, channel estimation has to be carried out by a receiver. Channel estimation is defined as a process in which a distorted signal is restored by compensating for signal distortion due to the fading. In general, for the channel estimation, reference signals which are known by both the transmitter and the receiver are required.

The reference signals may be allocated using either the first scheme in which the reference signals are allocated over the entire frequency band or the second scheme in which the reference signals are allocated over a part of the frequency band. The reference signals are further densely allocated in the first scheme rather than the second scheme. The channel estimation can be further accurately performed when the first scheme is used. On the other hand, a higher data transfer rate can be achieved in the second scheme rather than the first scheme. In the second scheme, the reference signals are scarcely allocated, and thus the channel estimation may degrade.

In the MIMO system, multiple channels are independently provided for multiple antennas. The reference signals need to be allocated in consideration of the multiple channels. In addition, the MIMO system may operate in either a single-codeword mode or a multiple-codeword mode according to a rank. The number of reference signals may increase along with the increase of the number of transmit antennas, and thus the number of antennas may increase. But, this may adversely affect the data transmission rate.

Also, if the multiple antennas are used, there is a need for considering each transmit power to each antenna. The reference signals are generally allocated with higher power than data. If the reference signals are allocated without the consideration of the transmit power, there is a difficulty that same power cannot be allocated to each antennas for applying transmit diversity or precoding.

Therefore, there is a need for a method in which the reference signals can be effectively allocated in consideration of the transmit power in the multiple-input multiple-output (MIMO) system.

DISCLOSURE OF INVENTION

Technical Problem

The present invention provides a method for allocating reference signals to substantially equally distribute transmit powers in a multiple-input multiple-output (MIMO) system.

Technical Solution

In one aspect, there is provided a method of allocating reference signals in a multiple-input multiple-output (MIMO) system. The reference signals allocated over a plurality of Orthogonal Frequency Division Multiplexing (OFDM) symbols and a plurality of subcarriers. The method includes allocating a first reference signal, a second reference signal and a third reference signal in a first OFDM symbol so that the first reference signal, the second reference signal and the third reference signal do not overlap with each other and allocating the first reference signal, the second reference signal and a fourth reference signal in a second OFDM symbol so that the first reference signal, the second reference signal and the fourth reference signal do not overlap with each other. The second reference signal is not contiguous with the first OFDM symbol. The first reference signal and the second signal are allocated in a regular intervals in a single OFDM symbol.

In another aspect, there is provided a method of allocating reference signals in a MIMO system. The method includes allocating a first reference signal for a first antenna and a second reference signal for a second antenna to two OFDM symbols, the two OFDM symbols which are separated from each other and allocating a third reference signal for a third antenna and a fourth reference signal for a fourth antenna to one of the two OFDM symbols, respectively.

Advantageous Effects

Synchronization and channel estimation can effectively be performed in a MIMO system. Transmit diversity and/or the precoding can be easily adapted to improve data transmission rate.

BRIEF DESCRIPTION OF THE DRAWINGS

FIG. 1 is a block diagram showing a transmitter having multiple antennas.

FIG. 2 is a block diagram of a receiver having multiple antennas.

FIG. 3 is an exemplary diagram showing reference signals for two transmit antennas.

FIG. 4 is an exemplary diagram showing reference signals for four transmit antennas.

FIG. 5 is an exemplary diagram showing reference signals for four transmit antennas according to one embodiment of the present invention.

FIG. 6 is an exemplary diagram showing reference signals for four transmit antennas according to another embodiment of the present invention.

FIG. 7 is an exemplary diagram showing reference signals for four transmit antennas according to still another embodiment of the present invention.

FIG. 8 is an exemplary diagram showing reference signals for four transmit antennas according to still another embodiment of the present invention.

MODE FOR THE INVENTION

The technique to be described below may be used in various communication systems. The communication systems are widely distributed so as to provide various communication services (e.g. voice, packet data, etc). The technique may be used for downlink or uplink. In general, downlink means communication from a base station (BS) to a user equipment (UE), and uplink means communication from the UE to the BS. The BS is generally referred to a fixed station that communicates with the UE and may also be referred to as another terminology such as a node-B, a base transceiver system (BTS) and an access point. The UE may be fixedly located or may have mobility. The UE may also be referred to as another terminology such as a mobile station (MS), a user terminal (UT), a subscriber station (SS) and a wireless device.

A communication system may be either a multiple-input multiple-output (MIMO) system or a multiple-input single-output (MISO) system. The MIMO system includes a plurality of transmit antennas and a plurality of receiving antennas. The MISO system includes a plurality of transmit antennas and a single receiving antenna.

There is no limit in a multiple access modulation scheme. The multiple access modulation scheme may be well-known single carrier modulation scheme (e.g. time division multiple access (TDMA), frequency division multiple access (FDMA), code division multiple access (CDMA), single carrier-frequency division multiple access (SC-FDMA)) or a multiple carrier modulation method (e.g. orthogonal frequency division multiplexing (OFDM)).

The channel estimation can be effectively performed by a receiver when reference signals are allocated under the following conditions.

First, the reference signals have to be allocated so that the receiver can distinguish the reference signals transmitted from multiple transmit antennas. This is because the reference signals are used by the receiver for the channel estimation. The reference signals can be allocated not to overlap one another in a time and/or frequency domain for the respective transmit antenna, so that the receiver can distinguish the reference signals. Alternatively, when the reference signals are orthogonal to each other in a code domain, the reference signals can overlap one another in the time and/or frequency domain. To achieve orthogonality in the code domain, the reference signals may use an orthogonal code having excellent auto-correlation or cross-correlation. Examples of the orthogonal code include a constant amplitude zero auto-correlation (CAZAC) sequence and a Walsh code.

Second, a channel variance has to be negligibly small in a region where the reference signals are placed. A channel in this region is used to decode data allocated adjacent to the reference signals. If the channel significantly changes in this region, a channel estimation error may become significant.

In addition, when the power is equally distributed to each of the respective transmit antennas, power consumption can be diminished.

In the following exemplary embodiments, reference signals may be shifted by a specific interval on the time domain or by a specific interval on the frequency domain. That is, for each subframe for respective transmit antennas, the reference signals may be generally shifted by a specific time interval and/or by a specific frequency interval while the interval between reference signals is maintained.

Each reference signal may be dedicated reference signal or a reference signal for multi-user signal. The multi-user signal may be broadcast signal and/or multicast signal. The broadcast signal is sent to all users within a specific area (e.g. cell and/or sector). The multicast signal is sent to a specific group of users. The dedicated reference signal is sent to a specific user. One example of the multi-user signal may be a mobile broadcast/multicast service (MBMS) signal. When transmitting the MBMS signal, the same signal is transmitted from all cells (or base stations). Therefore, all base stations use the same reference signal.

According to some MIMO technique such as cyclic delay diversity (CDD) and beamforming, an UE seems to receive reference signals through single transmit antenna. Therefore a BS does not need to transmit the reference signals by classifying the reference signals for respective transmit antennas.

In the following exemplary embodiments, various examples of a reference signal allocation for an MIMO system having four transmit antennas are described. The reference signals are allocated according to the following principles.

(1) The number of reference signals for a first antenna and a second antenna is larger than that of reference signals for a third antenna and a fourth antenna.

(2) Among the whole signals used, the percentage occupied by the entire reference signals is below a predetermined value. When the percentage of the entire reference signals increases, the receiver can relatively perform accurate channel estimation by receiving a plurality of reference signals. However, the higher the percentage, the lower the data rate is.

(3) Reference signals for each antenna do not overlap one another. The reference signals for each antenna do not overlap one another in both the time domain and the frequency domain.

Data transmission can be achieved in the unit of a subframe for each antenna. The subframe includes a plurality of OFDM symbols in a time domain and a plurality of subcarriers in a frequency domain. The subframe is a resource grid which is defined for each antenna. A transmission time interval (TTI) can be defined as a time required for transmitting a single subframe. For example, the subframe may include seven OFDM symbols where a TTI is 0.5 milli-second (msec.). However, the present inventive concept is not limited thereto, and thus the subframe and the TTI may be configured in various forms.

The reference signals are allocated for a subframe of each antenna. A reference signal for a first antenna (a first reference signal) is allocated for a subframe of the first antenna. A reference signal for a second antenna (a second reference signal) is allocated for a subframe of the second antenna. A reference signal for a third antenna (a third reference signal) is allocated for a subframe of the third antenna. A reference signal for a fourth antenna (a fourth reference signal) is allocated for a subframe of the fourth antenna.

Each of elements over a resource grid constituting a subframe is referred to as a resource element. For example, a resource element $q(k,l)$ is placed at a k-th OFDM symbol and an l-th subcarrier.

A subframe can be divided by two regions, a control channel and a data channel. The control channel is the region carrying control data. The data channel is the region carrying user data. For example, a first OFDM symbol, a second OFDM symbol and a third OFDM symbol may be allocated for the control channel and the other OFDM symbols may be allocated for the data channel. Although the number of OFDM symbols for the control channel is smaller than that of OFDM symbols for the control channel, the reliability for the control channel has to be higher than that of the data channel. Only a part of multiple antennas can be assigned for transmitting the control channel. A first antenna and a second antenna can be used for the control channel. In this case, reference signals for a third antenna and reference signals for a fourth antenna may not be assigned for the OFDM symbols for the control channel because the third antenna and the fourth antenna are not used for the control channel.

FIG. 1 is a block diagram of a transmitter having multiple antennas.

Referring to FIG. 1, a transmitter 100 includes a channel encoder 120, a mapper 130, an MIMO processor 140, a subcarrier allocation unit 150 and an OFDM modulator 160. The channel encoder 120 encodes an input stream according to a predetermined coding scheme and then generates a coded word. The mapper 130 maps the coded word to a symbol that represents a position on signal constellation. Since there is no limit in a modulation scheme of the mapper 130, the modulation scheme may be m-phase shift keying (m-PSK) or m-quadrature amplitude modulation (m-QAM). Examples of the m-PSK include BPSK, QPSK, and 8-PSK. Examples of the m-QAM include 16-QAM, 64-QAM, and 256-QAM. The MIMO processor 140 processes an mapped symbol by using an MIMO scheme according to transmit antennas 190-1, . . . , 190-Nt (Nt>1). For example, the MIMO processor 140 may handle codebook-based pre-coding.

The subcarrier allocation unit 150 allocates an input symbol and reference signals to subcarriers. The reference signals are allocated for the respective transmit antennas 190-1, . . . , 190-Nt. The reference signals, also referred to as pilots, are used for channel estimation or data demodulation and are known by both the transmitter 100 and a receiver 200 of FIG. 2. The OFDM modulator 160 modulates a allocated symbol and thus outputs an OFDM symbol. The OFDM modulator 160 may perform inverse fast Fourier transform (IFFT) on the allocated symbol, and may further insert a cyclic prefix (CP) therein after IFFT is performed. The OFDM symbol is transmitted through the respective transmit antennas 190-1, . . . , 190-Nt.

FIG. 2 is a block diagram of a receiver having multiple antennas.

Referring to FIG. 2, a receiver 200 includes an OFDM demodulator 210, a channel estimator 220, an MIMO postprocessor 230, a demapper 240, and a channel decoder 250.

Signals received from receive antennas 290-1, . . . , 290-Nr are subject to fast Fourier transform (FFT) by the OFDM demodulator 210. The channel estimator 220 obtains an estimated channel by using reference signals. The MIMO postprocessor 230 performs post-processing equivalent to the MIMO processor 140. The demapper 240 demaps the input symbol to a coded word. The channel decoder 250 decodes the coded word so as to be restored to original data.

Hereinafter, data are transmitted in unit of a subframe for each transmit antenna. For clarity, 14 OFDM symbols constituting the subframe are respectively referred to as a first OFDM symbol, a second OFDM symbol, . . . , and a 14th OFDM symbol from the beginning of a TTI.

FIG. 3 is an exemplary diagram showing reference signals for two transmit antennas.

Referring to FIG. 3, a first reference signal R1 and a second reference signal R2 are respectively allocated to a subframe for a first antenna and a subframe for a second antenna. The first reference signal R1 is a reference signal for the first antenna, and the second reference signal R2 is a reference signal for the second antenna. The first reference signal R1 and the second reference signal R2 may be identical or may be different from each other.

A data symbol or a null symbol is allocated to subcarriers to which the reference signal is not allocated. The null symbol is generated by puncturing a corresponding subcarrier and its transmit power is equal to zero.

The first reference signal R1 and the second reference signal R2 are allocated at the intervals of two subcarriers in the first OFDM symbol and the 8th OFDM symbol. The second reference signal R2 is allocated by being shifted as much as three subcarriers from the first reference signal R1. When a subframe includes 12 subcarriers, total four reference signals including two of the first reference signal R1 and two of the second reference signal R2 may be allocated over the 12 subcarriers. The first reference signal R1 and the second reference signal R2 can evenly be allocated on an OFDM symbol of the subframe.

The positions of the first reference signal R1 and the second reference signal R2 in the 5th OFDM symbol and the 12th OFDM symbol are exchanged differently from those of the first reference signal R1 and the second reference signal R2 in the first OFDM symbol.

When two transmit antennas are used, reference signals are transmitted by boosting power as much as 3 dB more than data symbols through puncturing. By power boosting of the reference signals, the efficiency of channel estimation may be improved.

FIG. 4 is an exemplary diagram showing reference signals for four transmit antennas.

Referring to FIG. 4, a first reference signal R1 is a reference signal for a first antenna, a second reference signal R2 is a reference signal for a second antenna, a third reference signal R3 is a reference signal for a third antenna, and a fourth reference signal R4 is a reference signal for a fourth antenna.

The allocation of the first reference signal R1 and the second reference signal R2 is identical to the allocation for two transmit antennas of the embodiment shown in FIG. 3.

The third reference signal R3 and the fourth reference signal R4 are allocated in the second OFDM symbol and the 9th OFDM symbol. The third reference signal R3 and the fourth reference signal R4 are allocated at the intervals of two subcarriers in the second OFDM symbol. The fourth reference signal R4 is allocated by being shifted as much as three subcarriers from the third reference signal R3. The positions of the third reference signal R3 and the fourth reference signal R4 in the 9th OFDM symbol differently are exchanged from those of the third reference signal R3 and the fourth reference signal R4 in the second OFDM symbol.

When reference signals are transmitted by using four transmit antennas, the number of the third reference signal the fourth antenna is less than that of the first reference signal and the second reference signal so as to diminish overhead by the number of reference signals.

It may be difficult to allocate same power to respective antenna when transmit diversity is used or precoding is applied. When power boosting level of the reference signal is lowered through the puncturing, performance of channel estimation may be degraded.

FIG. 5 is an exemplary diagram showing reference signals for four transmit antennas according to one embodiment of the present invention.

Referring to FIG. 5, the allocation of the first reference signal R1 and the second reference signal R2 is identical to the allocation for two transmit antennas of the embodiment shown in FIG. 3. A third reference signal R3 is allocated in the first OFDM symbol and the 8th OFDM symbol. A fourth reference signal R4 is allocated in the 5th OFDM symbol and the 12th OFDM symbol. The third reference signal R3 and the fourth signal (R4) are contiguous to the first reference signal R1.

The first reference signal R1, the second reference signal R2 and the third reference signal R3 are allocated to one OFDM symbol while the first reference signal R1, the second reference signal R2 and the fourth reference signal R4 are allocated to another OFDM symbol.

When four transmit antennas are used, the number of the third reference signal and the fourth reference signal is less than that of the first reference signal and the second reference signal so as to diminish overhead by reference signals.

When the third reference signal R3 and the fourth reference signal R4 are allocated to an OFDM symbol, the first reference signal R1 and the second reference signal R2 are also allocated to the OFDM symbol. On the contrary, although the first reference signal R1 and the second reference signal R2 are allocated to an OFDM symbol, the third reference signal R3 and the fourth reference signal R4 may not be allocated to the OFDM symbol. The third reference signal R3 or the fourth reference signal R4 is allocated so that frequency selective gain becomes maximum as much as possible.

A null symbol may be allocated to the subcarrier which reference signals are not allocated over an OFDM symbol where the reference signals are allocated. That is, the subcarrier which a reference signal is not allocated doesn't transmit any data. Transmit power is not allocated to the null symbol while extra transmit power is allocated to the reference signal. For example, when there are all 12 subcarriers in the first OFDM symbol, two subcarriers are respectively allocated to a first reference signal R1, a second signal (R2) and a third reference signal R3. Null symbols are allocated to six subcarriers to which reference signals are not allocated. Since the number of the subcarriers for the reference signals and the number of the subcarriers for the null symbol is the same, transmit power for respective transmit antenna can evenly be allocated.

By proposed reference signal structure, power level of a reference signal can be boosted about 3 dB by the puncturing while data is not transmitted in an OFDM symbol. A transmit antenna which does not transmit any reference signal does not transmit any data and the transmit antenna has no transmit power. For example, when a first OFDM symbol includes the first reference signal R1, the second reference signal R2 and the third reference signal R3, the first antenna, the second antenna and the third antenna are only used but the fourth antenna is not used in the transmission of the first OFDM symbol. Likewise, when a fourth symbol includes the first reference signal R1, the second reference signal R2 and the fourth reference signal R4, the first antenna, the second antenna and the fourth antenna are only used but the third antenna is not used in the transmission of the fourth OFDM symbol.

The performance of the channel estimation due to the reduction of power boosting level is not degraded. The overhead of reference signals can be minimized.

It is assumed that the total power of an OFDM symbol including reference signals is 1 and the reference signals are transmitted by three transmit antennas after being boosted as much as 3 dB by using the puncturing. The power that is used by the first reference signal R1, the second reference signal R2 and the third reference signal R3 is respectively 4/12 in a first OFDM symbol. The number of the subcarrier for the first reference signal R1, the second reference signal R2 and the third reference signal R3 is respectively two in the first OFDM symbol. Subcarriers which are not used for reference signals do not have any transmit power by puncturing. Therefore, double transmit power can respectively be allocated to six subcarriers for the first reference signal R1, the second reference signal R2 and the third reference signal R3. Since ratio of the transmit powers which are used by the first antenna, the second antenna and the third antenna respectively becomes 1:1:1, the unbalance of the transmit power is not occurred.

Although the aforementioned reference signal allocation is exemplified, the present inventive concept is not limited thereto, and thus reference signals may be shifted by a specific interval on the time domain or by a specific interval on the frequency domain. That is, for each subframe for respective transmit antennas, the reference signals may be generally shifted by a specific time interval and/or by a specific frequency interval while the interval between reference signals is maintained. Since the reference signals can be generally shifted as described above without having to reallocate the reference signals, channel estimation can be performed for multiple cells, multiple sectors and multiple users.

Reference signals for a specific antenna may be partially or entirely used (or not used) according to time-varying channel variation in a multiple of the number of subframes.

Synchronization and channel estimation in a multiple antenna system can effectively be performed and it is suitable to data transmission using the transmit diversity and the precoding. Also, reference signals can be transmitted in same manner carrier as a single antenna system. A receiver can estimate a channel variation independently for each transmit antenna.

FIG. 6 is an exemplary diagram showing reference signals for four transmit antennas according to another embodiment of the present invention.

Referring to FIG. 6, the allocation of a first reference signal R1 and a second reference signal R2 is identical to that of the first reference signal R1 and the second reference signal R2 of the embodiment shown in FIG. 3. A third reference signal R3 is allocated to a first OFDM symbol and a 8th OFDM symbol. A fourth reference signal R4 is allocated to a 5th OFDM symbol and a 12th OFDM symbol. The third reference signal R3 and the fourth reference signal R4 are contiguous to the second reference signal R2.

FIG. 7 is an exemplary diagram showing reference signals for four transmit antennas according to still another embodiment of the present invention.

Referring to FIG. 7, the allocation of a first reference signal R1 and a second reference signal R2 is identical to that of the first reference signal R1 and the second reference signal R2 of the embodiment shown in FIG. 3. A fourth reference signal R4 is allocated to a first OFDM symbol and a 8th OFDM symbol. A third reference signal R3 is allocated to a 5th OFDM symbol and a 12th OFDM symbol. The third reference signal R3 and the fourth reference signal R4 are contiguous to the first reference signal R1.

The first reference signal R1, the second reference signal R2 and the fourth reference signal R4 are allocated to one OFDM symbol. The first reference signal R1, the second reference signal R2 and the third reference signal R3 are allocated to another OFDM symbol.

FIG. 8 is an exemplary diagram showing reference signals for four transmit antennas according to still another embodiment of the present invention.

Referring to FIG. 8, the allocation of a first reference signal R1 and a second reference signal R2 is identical to that of the first reference signal R1 and the second reference signal R2 of the embodiment shown in FIG. 3. A fourth reference signal R4 is allocated to a first OFDM symbol and a 8th OFDM symbol. A third reference signal R3 is allocated to a 5th OFDM symbol and a 12th OFDM symbol. The third reference signal R3 and the fourth reference signal R4 are contiguous to the second reference signal R2.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of allocating reference signals in a multiple-input multiple-output (MIMO) system, the reference signals allocated over a plurality of Orthogonal Frequency Division Multiplexing (OFDM) symbols and a plurality of subcarriers, the method comprising:
   allocating a first reference signal, a second reference signal and a third reference signal in a first OFDM symbol so that the first reference signal, the second reference signal and the third reference signal do not overlap with each other; and
   allocating the first reference signal, the second reference signal and a fourth reference signal in a second OFDM symbol,
   wherein the first reference signal and the second reference signal are either allocated in regular intervals in the first OFDM symbol or allocated in regular intervals in the second OFDM symbol, and
   wherein all transmit powers for the first reference signal, the second reference signal and the third reference signal are the same in the first OFDM symbol.

2. The method of claim 1, wherein:
   a null symbol is allocated to a subcarrier in the first OFDM symbol; and
   neither the first, second nor third reference signal is allocated to the subcarrier.

3. The method of claim 1, wherein:
   a null symbol is allocated to a subcarrier in the second OFDM symbol; and
   neither the first, second nor fourth reference signal is allocated to the subcarrier.

4. A method of allocating reference signals in a multiple-input multiple-output (MIMO) system, the reference signals allocated over a plurality of Orthogonal Frequency Division Multiplexing (OFDM) symbols and a plurality of subcarriers, the method comprising:
   allocating a first reference signal for a first antenna and a second reference signal for a second antenna to two OFDM symbols that are separated from each other; and
   allocating a third reference signal for a third antenna to one of the two OFDM symbols and allocating a fourth reference signal for a fourth antenna to the other of the two OFDM symbols,
   wherein transmit powers of a plurality of antennas used for transmitting the first, second, third and fourth reference signals are the same on a single OFDM symbol.

5. The method of claim 4, wherein:
   a null symbol is allocated to a subcarrier in one of the two OFDM symbols; and
   neither the first, second, third nor fourth reference signal is allocated to the subcarrier.

6. A mobile terminal comprising:
   a Radio Frequency (RF) unit for transmitting and receiving radio signals using a plurality of antennas and a plurality of Orthogonal Frequency Division Multiplexing (OFDM) symbols;
   a processor coupled to the RF unit and configured to:
      allocate a first reference signal for a first antenna and a second reference signal for a second antenna to two OFDM symbols that are separated from each other; and
      allocate a third reference signal for a third antenna to one of the two OFDM symbols and allocate a fourth reference signal for a fourth antenna to the other of the two OFDM symbols,
   wherein transmit powers of a plurality of antennas used for transmitting the first, second, third and fourth reference signals are the same on a single OFDM symbol.

* * * * *